United States Patent Office 3,227,514
Patented Jan. 4, 1966

3,227,514
METHOD AND APPARATUS OF CONTINUOUSLY OBTAINING URANIUM DIOXIDE WITH PREDETERMINED CHARACTERISTICS FROM URANIUM TRIOXIDE
Paul Vertes, Mennecy, Henri Huet, Saint-Vrain, and Maurice Delange, Ballancourt, France, assignors to Commissariat à l'Energie Atomique, Paris, France
Filed Nov. 7, 1961, Ser. No. 150,717
Claims priority, application France, Nov. 28, 1960, 845,225
1 Claim. (Cl. 23—14.5)

The effecting of solid-gas reactions is frequently used in industry for many application; this is notably the case when preparing uranium dioxide $UO_2$ by the reduction of uranium trioxide $UO_3$.

In practice, this preparation present a certain number of difficulties principally due to the fact that the reactions effected are very exothermic and the intermediate compounds obtained are very unstable, which has the effect of rendering particularly difficult the control and the regulation of the temperatures on which the properties and the homogeneity of the product obtained depend.

Moreover, the uranium dioxide to be obtained should have predetermined characteristics according to the uses envisaged, such as for example, for the preparation of combustible sintered elements, the manufacture of uranium tetrafluoride, or the direct preparation of metallic uranium by the metallo-thermic reduction of $UO_2$.

The characteristics to be fixed, some of which are the specific surface, the stoichiometric composition, the apparent density and the stability in relation to the oxygen of the air, should be capable of reproduction with certainty, and for this it is necessary to carry out all the stages of the transformation of $UO_3$ into $UO_2$ in very precise conditions of operation.

The present invention has for its object a method of obtaining uranium dioxide with predetermined characteristics in which constant control of the reaction is possible at each stage.

The mode of operation of the invention ensures a continuous process and consequently is of great interest to industry.

The invention likewise concerns the apparatus for carrying out the process.

According to the invention, the method of obtaining uranium dioxide, of predetermined characteristics, by the reduction of uranium trioxide is characterised by the combination of various operation as follows:

(a) Firstly a first partial reduction of the $UO_3$ is carried out in such a manner as to obtain an oxide whose degree of oxidisation may, according to the compound which is is desired to obtain, reach all values between $UO_3$ and $U_3O_8$ inclusive, passing through all the intermediate values. This oxide will be called $U_mO_n$ in the following description.

To effect this reduction, the $UO_3$ is heated to a temperature between 600° and 900° in air circulating in a countercurrent. This temperature is controlled in such a way that the $U_mO_n$ obtained has a specific surface that corresponds to the reactivity required for the final reduction of the $U_mO_n$ to $UO_2$.

(b) $U_mO_n$ thus obtained can either be cooled to the ambient temperature and then, in this case, simply stored, on account of the stability, or else it can be cooled to a temperature between 200° and 400° C. in the case where it is to be re-used immediately for its reduction to $UO_2$.

(c) The reduction of the $U_mO_n$ is effected at a temperature between 400° and 800° C. and a gaseous phase comprising a gas reducing agent diluted by a neutral gas is circulated in a countercurrent to the solid. The gas reducing agent to be used for example may be hydrogen or advantageously ammonia whose endothermic cracking inside the reactor will absorb calories and generate hydrogen, and the neutral gas may be nitrogen, argon or carbonic gas.

(d) Next, thermal stabilisation occurs, in the course of which reduction is eventually achieved while maintaining the product a temperature between 800° and 1000° C. and while circulating a gaseous phase comprising a gas reducing agent in a countercurrent to the solid. This phase will be richer in reducing gas than that used during the preceding reduction and will be constituted for example by the cracked ammonia.

(e) The uranium dioxide powder obtained is cooled to the ambient temperature, cooling being effected in a nonoxidising gaseous atmosphere such as nitrogen, for example, or in the atmosphere of a reducing agent.

(f) Finally the chemical stabilisation of the cooled uranium dioxide powder is effected by circulation a stabiliser in a countercurrent, the stabiliser being oxygen, for example, possibly diluted by a neutral gas, or even the vapours of carbon tetrachloride.

This process, in which the reduction of $UO_3$ to $UO_2$ is effected progressively in several stages, has the following principal advantages:

Each stage of the transformation can be effected at a predetermined temperature which is controlled perfectly, despite the strong exothermicity of the reactions of the reduction this control of the temperature is facilitated by the fact that the heating which occurs during the reactions forming the new $U_mO_n$, $U_3O_8$ and $UO_2$ are far less important and finally more simple to control than when $UO_3$ is changed directly to $UO_2$.

The fact that one may choose within a certain interval the temperature at which the $U_mO_n$ formed as part of $UO_3$ is heated permits the action on the specific surface of the compound and finally obtains this $U_mO_n$ with a reactivity of a predetermined value, of such type that the reduction to $UO_2$ can finally be effected in such a manner as to obtain characteristics for the final product which are pre-defined and chosen in advance.

The thermal stabilisation has the effect not only of possibly achieving the reduction to $UO_2$ but also of obtaining a homogeneous product which corresponds exactly to the characteristics desired.

The chemical stabilisation enables a product to be obtained which can be manipulated in free air.

According to the invention, the apparatus for carrying out this process is characterised by the following elements considered in combination.

(1) A vertical or horizontal tubular furnace with a feed hopper for introducing the solid phase, a countercurrent circulation of gas and an electric heater.

(2) A vertical or horizontal tubular cooler provided with a double envelope with a cooling water circuit and possibly a countercurrent of neutral gas.

(3) A vertical tubular furnace, of the moving bed type, with a countercurent of gas and an electric heater.

As described below, the vertical furnace mentioned above may be directly connected to the preceding cooler or else completely independent thereof.

(4) A horizontal tubular furnace heated electrically comprising a coiled reactor and a countercurrent of gas.

(5) A horizontal tubular coiled cooler provided with a double envelope with a cooling water circuit and a countercurrent of a neutral gas or reducing gas, possibly cooled.

In a modification of the apparatus, two vertical discontinuous coolers are used in parallel, one being filled while the other is emptied.

A further modication comprises the use of a continuously vibrated horizontal cooler.

(6) A stabilizer constituted by a horizontal tube provided with a coil in which the stabilising gas circulates in countercurrent. This stabiliser may be cooled from the outside by the circulation of water in a double envelope and from within by the circulation of water in the coil.

Between all these elements are provided obturators permitting the isolation of the gaseous phases contained in the different reactors.

These obturators according to the temperatures of the gases are either of the rotary type or of the throttle type with possibly a current of neutral gas penetrating into the throttle with a higher pressure than any of the pressures existing in one part or the other of the throttle.

This apparatus facilitates the continuous operation and the possibility of separately regulating the function of each of the elements described above.

Referring to the accompanying diagrammatic FIGURES 1, 2 and 3, which are described below, different embodiments are described by way of example only, of the manner of carrying out the process and the apparatus for the continuous manufacture of uranium dioxide with predetermined characteristics, from uranium trioxide. The different embodiments which are described should be considered as part of the invention, it being understood that all similar devices may be used within the scope of the invention.

FIG. 1 shows:

Figure 1:
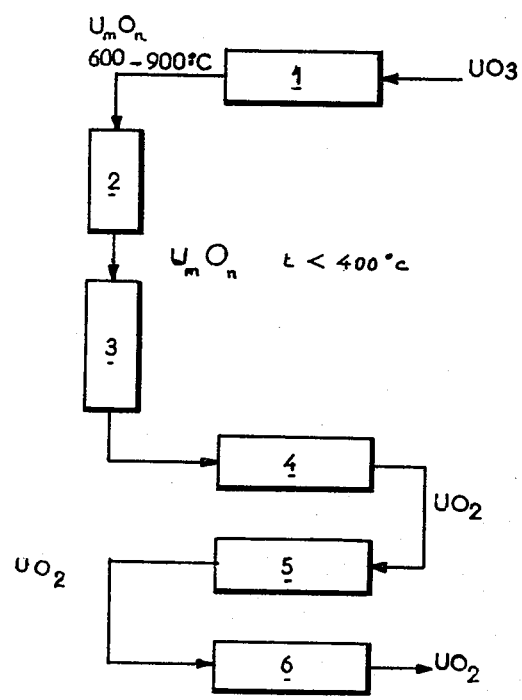
FIG. 1 shows diagrammatically the principle of the invention, showing the cycle of the various operations effected according to the invention in carrying out the method of preparing $UO_2$ from $UO_3$.

The furnace 1 in which the reduction of the $UO_3$ is effected to the stage $U_mO_n$.

In order to effect this reduction the $UO_3$ is heated in a current of air at a temperature between 600° and 900° C.

The cooler 2 in which the oxide leaving the furnace 1 is cooled, this cooling differing according to whether the assembly constituted by the furnace 1 and the cooler 2 is connected to the rest of the apparatus or whether it is completely independent therefrom.

In the following description, the term calcination assembly will mean the group comprising the furnace 1 and the cooler 2, and the term reduction-stabilisation assembly will mean the rest of the apparatus.

In the case where these two assemblies are joined as a whole, the oxide leaving the cooler is immediately re-utilised for its reduction to $UO_2$ and then cooling is carried out down to a temperature of 200–400° C. In effect, it is useless to cool completely the oxide leaving the cooler 2 for it would then be necessary to reheat it during the course of the subsequent reductoin. Economy in the consumption of electrical energy used for heating is thus effected.

In the case where the two assemblies are separate, the oxide leaving the cooler 2 is stored, which does not however necessitate any special precautions since it is a very stable product. Cooling is effected down to the ambient temperature.

The tube 3, in which a second stage of reduction of the oxide previously obtained is effected, operating at a temperature of between 400° and 800° and using a reducing gaseous phase.

The reactor 4, in which the thermal stabilization is effected during the course of which the product leaving the tube 3 is possibly reduced and at the same time made homogeneous, working between 800° and 1000° C. and using a reducing gaseous phase.

The cooler 5, in which the temperature of the $UO_2$ leaving the reactor 4 is brought to the ambient temperature.

The stabiliser 6, in which the chemical stabilization of the $UO_2$ is effected by means of the appropriate gaseous phase in a manner to accelerate or retard its spontaneous oxidization in the air.

In the following description, relating to FIGURES 2 and 3, the different elements of the apparatus will be described successively and these will at the same time explain their mode of operation in the case where this apparatus is used for obtaining uranium dioxide of predetermined characteristics.

Only elements necessary for understanding the invention are shown in the figures, the corresponding elements in different figures having the same references.

Figure 2:
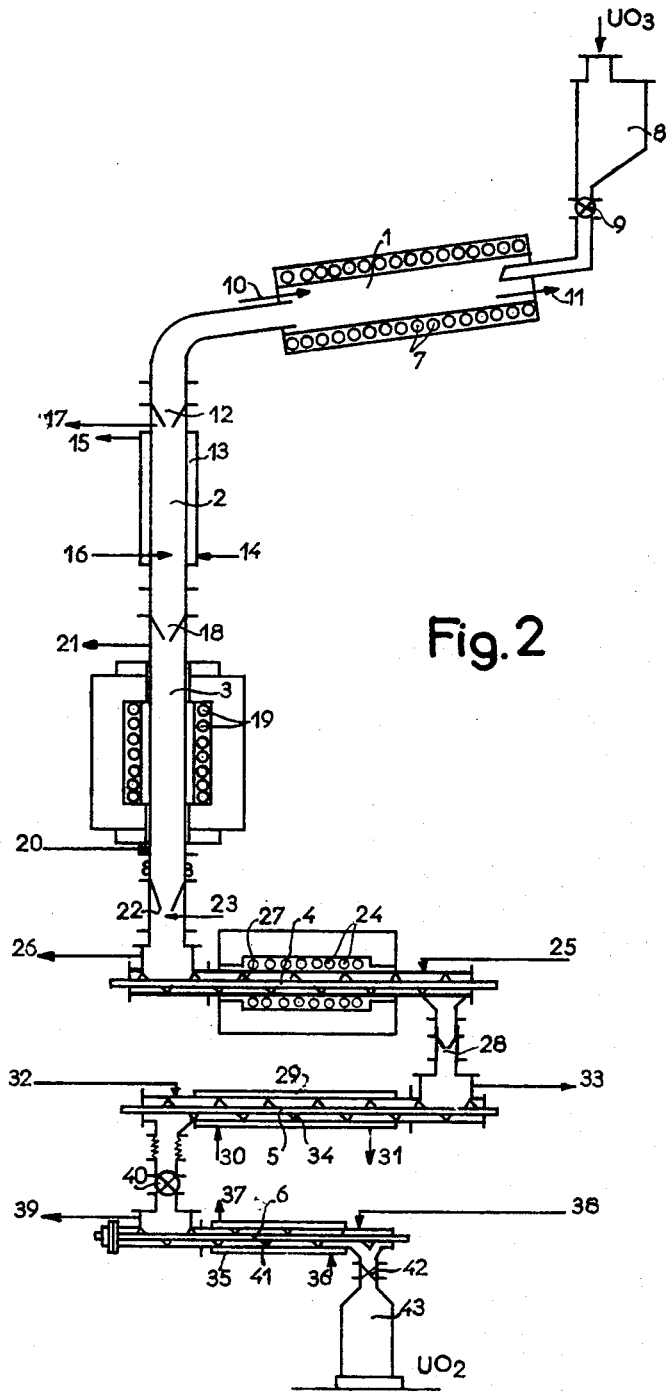
FIG. 2 shows a vertical section through one embodiment of the apparatus for obtaining uranium dioxide $UO_2$ by the reduction of uranium trioxide $UO_3$.

FIG. 2 shows the following:

The furnace 1 in which a first solid-gas reaction is effected. This furnace 1 is represented on FIG. 2 by a horizontal rotatable furnace, provided with electrical heating means 7. The $UO_3$ in the form of pastilles or granules is introduced into the furnace by means of hopper 8; at the base of this hopper 8 is provided a rotatable obturation 9 permitting the supply of $UO_3$ to the furnace, and at the same time preventing the release of powder to the outside.

The $UO_3$ is heated inside the furnace 1 to a temperature between 600° and 900° C., in the presence of a countercurrent of air, the inlet of which is designated 10 and the outlet 11.

The vertical cooler 2 in which the oxide leaving the furnace 1 flows through a throttle 12. This cooler 2 comprises a double envelope 13 with a water inlet at 14 and an outlet at 15. Nitrogen introduced at 16 and leaving at 17 circulates in a countercurrent to the oxide.

It can be seen that several modifications of the furnace 1 and the cooler 2 can be provided. Thus the furnace and/or cooler may be of the horizontal type, for example rotatable or coiled, or of the vertical type.

The vertical furnace 3 into which the oxide flows through throttle 18 in the form of $U_3O_8$ or in an intermediate form between $UO_3$ and $U_3O_8$.

The furnace includes electric heating means 19.

The reduction can be effected with hydrogen or with ammonia diluted by a neutral gas (nitrogen, argon, carbonic gas).

It is advantageous to choose ammonia which will crack directly inside the reactor by absorption of some of the calories of the reduction reaction which is exothermic on account of the endothermicity of this cracking, resulting in the automatic control of the temperatures which renders the reduction reaction particularly simple to carry out at low temperature.

A mixture of ammonia-nitrogen gas is introduced at 20 and the escaping gases leave at 21. The temperature of the reaction is regulated between 400 and 800° C.

The substances flow to the lower part of the furnace 3 through a throttle 22 beneath which there is fed a current of nitrogen 23. Since the pressure of this gas is higher than the pressures prevailing on the downstream and upstream sides of the throttle, the nitrogen thus prevents any possible mixture between the gaseous phase of the horizontal reactor 4 leaving at 26 and the gaseous phase entering the vertical furnace 3 at 20. The nitrogen introduced at 23 leaves again at one and the same time at 21 and 26.

The horizontal reactor 4 includes electrical heating means 24. A current of cracked ammonia is fed at 25 and the escaping gases leave at 26. A coil 27 ensures the circulation of the product and allows very efficient mixture to take place with the continuous renewal of the contact surfaces between the solids and the gas and a good homogeneity of the temperature. In the reactor 4, thermal stabilization occurs, during which the reduction of the $U_mO_n$ is subsequently perfected to $UO_2$, such that the product escaping is constituted solely by a homogeneous $UO_2$, that is to stay of a constant composition in all parts.

The horizontal cooler 5, into which the $UO_2$ leaving the reactor 4 flows via a throttle 28, comprises a double envelope 29 cooled by a circulation of water entering at 30 and leaving at 31. Nitrogen, previously cooled if desired, is introduced at 32 and leaves at 33. A coil 34 ensures the circulation of the product and facilitates the exchange of calories.

The horizontal chemical stabilizer 6 comprises a double envelope 35 cooled by a circulation of water entering at 36 and leaving at 37.

Stabilizer, constituted for example by oxygen or by carbon tetrachloride vapour, circulating in a counter-current to the powder $UO_2$, enters at 38 and leaves at 39. Between the cooler 5 and the stabilizer 6 is placed a rotary obturation 40 permitting the flow therethrough of $UO_2$ but entirely preventing the mixture of the gaseous phases.

A coil 41 ensures the circulation of the $UO_2$ which flows across an extraction fan 42 into a receptacle 43.

Figure 3:
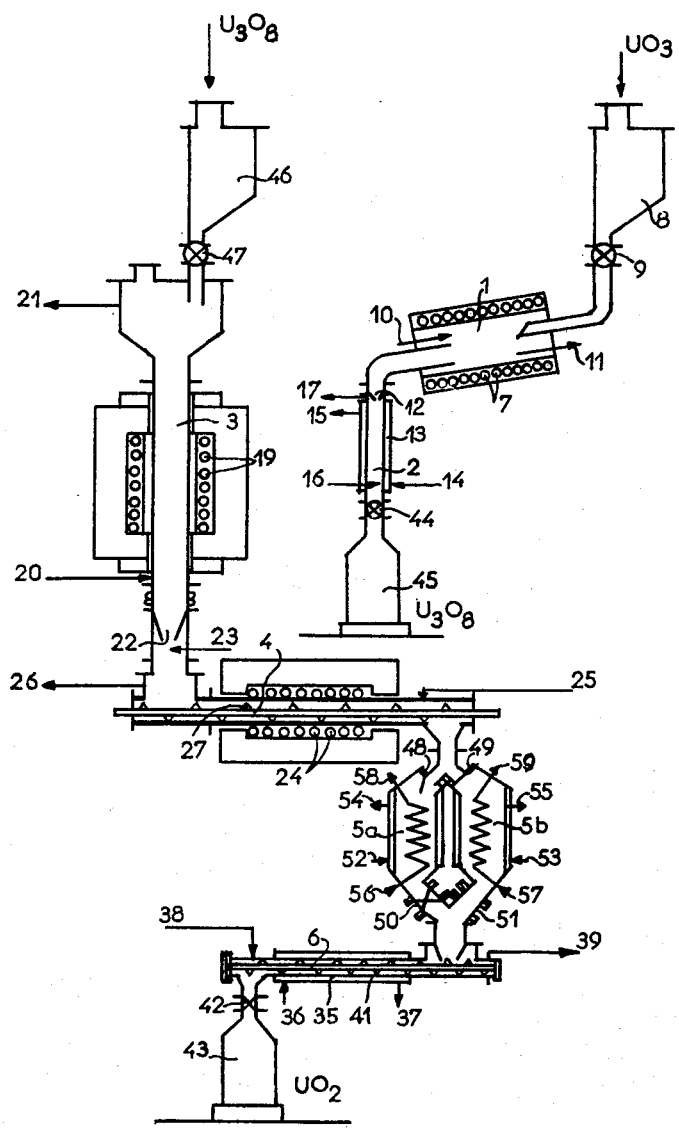
FIG. 3 shows a vertical section through a modified embodiment of the preceding apparatus.

FIG. 3 shows a similar apparatus as that shown in FIG. 2 but comprising the following modifications:

The calcination assembly is separate from the reduction-stabilization assembly.

The horizontal cooler is replaced by two vertical discontinuous coolers 5a and 5b, situated parallel to one another, one being filled while the other is emptied.

The rest of the apparatus, that is to say the vertical furnace 3, the horizontal reactor 4 and the horizontal chemical stabilizer 6, are exactly the same as those shown in FIG. 2.

As mentioned above, the calcinated oxide leaving the rotary horizontal furnace 1 is cooled to the ambient temperature in the vertical cooler 2. It flows to the outlet of this cooler through a rotary obturation 44 into a receptacle 45 and can then be easily stored because it is a stable product.

The oxide in the state of $U_3O_8$ or even in an intermediate state between $UO_3$, and $U_3O_8$, is then introduced into the vertical tube 3 through hopper 46.

At the base of this hopper there is provided a rotary obturation 47 playing the same role as the obturator 9, that is to say, permitting the supply therethrough of all matter but hindering the flow of powder to the outside.

The two coolers 5a and 5b are each provided at their lower part and at their inner part with obturations numbered respectively 48 and 49, 50 and 51, the opening and closure of which are controlled automatically by the degree of cooling of the powdered $UO_2$. They each have two circuits of cooling water, on the one hand a double envelope in which the water arrives at 52 and 53 and leaves at 54 and 55, and on the other hand, a coil in which the water arrives at 56 and 57 and leaves at 58 and 59.

The $UO_2$ thus cooled to the ambient temperature flows continuously into the chemical stabilizer 6, the constitution and role of which are identical to those described previously with respect to FIG. 2.

The apparatus according to the invention has the following advantages:

High efficiency of the use of the reactives.
No escape of the powder.
Incessant renewal of the contact surfaces between the solids and the gas.

Effective homogeneity of the temperatures.
The possibility of effecting the reaction in several stages and of regulating each stage separately.
The complete separation of the different gaseous phases.

Several examples of the method of carrying out the process with an apparatus identical with that of FIG. 2 or 3 are described below by way of example only.

EXAMPLE 1

This example relates to the preparation of $UO_2$ suitable for sintering in the case in which the apparatus used comprises a calcination assembly directly connected to the reduction/stabilisation assembly.

The first stage of the reduction of the $UO_3$ is effected in the furnace 1 while effecting the calcination at a temperature of 650° C. This temperature is chosen in order to obtain an oxide of uranium having substantially the composition $UO_3$, $U_3O_8$ and a specific surface of 6 m.²/g.

The oxide obtained is then cooled in the cooler 2 in a manner to lower its temperature to between 200° and 250° C.

The reduction of the oxide thus cooled is effected in the vertical furnace 3 at about 700° to 750° C. using a reducing gaseous phase such as non-cracked ammonia.

The thermal stabilisation is effected in the horizontal coil reactor 4 at a temperature of 900° C. using a gaseous phase such as dilute cracked ammonia having the following composition: 1 volume of hydrogen to 4 volumes of nitrogen.

The $UO_2$ thus obtained is cooled to a temperature of 10–15° C.

Finally, the $UO_2$ is stabilised by using a gaseous phase constituted by one volume of oxygen to 3 volumes of nitrogen.

Thus, powdered uranium dioxide having a specific surface of 3.5 m.²/g. is obtained with a homogeneous composition represented by the formula $UO_{2.15}$.

EXAMPLE 2

This example likewise relates to the preparation of $UO_2$ for sintering, but operating in an apparatus in which the calcination assembly is independent of the reduction/stabilisation assembly.

In this case, the cooling in cooler 2 is effected down to the ordinary temperature and this necessitates a supplementary expenditure of the calories in the furnace 3, all other conditions being otherwise identical with those of Example 1. In this way, $UO_2$ is obtained having the same characteristics as those described above.

EXAMPLE 3

The same conditions as those in Example 1 are used, with the exception of the composition of the gaseous phase used for the chemical stabilisation. Here carbon tetrachloride vapours are used at the rate of 1 kg. of $CCl_4$ to 100 kg. of $UO_2$.

In this way, $UO_2$ is obtained having the same characteristics as those described in Example 1.

EXAMPLE 4

This example relates to the preparation of $UO_2$ for fluorination.

The qualities desired are: a stoichiometric composition as close as possible to $UO_{2.0}$ compatible with a satisfactory reactivity of the product, and the non-pyrophoricity of the powder during manipulation in free air. Such a result is obtained in the same operating conditions as those of Example 1 with the exception, on the one hand, that the temperature of thermal stabilisation is held at 1000° C., and, on the other hand, that the chemical stabilisation is completely eliminated.

The surface obtained is thus 2 m.²/g.; the composition is homogeneous and corresponds to the formula $UO_{2.04}$.

What we claim is:

In a method for continuously obtaining uranium dioxide with predetermined characteristics of specific surface, composition, apparent density and stability with respect to oxygen, the steps of circulating a solid phase initially constituted by uranium trioxide $UO_3$ in a circuit, then heating this phase in a countercurrent of air at a temperature between 600° and 900° C. until it has a mean composition $U_mO_n$, the ratio $m/n$ being greater than ⅓ and at the most equal to ⅜, then cooling the compound $U_mO_n$ to a temperature lower than 400° C., then reducing the compound $U_mO_n$ to uranium dioxide by heating to a temperature between 400° and 800° C. in the presence of a non-oxidizing gaseous phase in countercurrent circulation and containing hydrogen and a neutral diluent gas, then stabilizing the uranium dioxide by heating to a temperature between 800° and 1000° C. in the presence of a gaseous phase richer in reducing gas than the preceding gaseous phase, then cooling the uranium dioxide to ambient temperature in the presence of a non-oxidizing atmosphere circulating countercurrent to the solid phase, and then stabilizing the uranium dioxide at ambient temperature by carbon tetrachloride vapors circulating countercurrent to the solid phase.

References Cited by the Examiner

UNITED STATES PATENTS

| | | | |
|---|---|---|---|
| 2,477,924 | 8/1949 | Fried | 23—14.5 |
| 2,761,767 | 9/1956 | Perieres | 23—262 |
| 2,807,519 | 9/1957 | Polissar | 23—14.5 |
| 2,911,290 | 11/1959 | Jonke et al. | 23—284 |

FOREIGN PATENTS 625,714   8/1961   Canada.

OTHER REFERENCES

AEC Document: HW 39767, 13 pages, Nov. 16, 1955.

AEC Document: CF–51–10–133, pp. 6, 7, 12, 16, 17, Oct. 16, 1951.

Anderson: "Proc. of the Chem. Society," April 1960, pp. 145, 146.

Harrington et al.: "Chem. Engng. Progress," vol. 54, No. 3, March 1958, pp. 65–67, 69.

Gronvold: "J. Inorg. and Nuclear Chemistry," vol. 1, pages 357–370 (1955) Pergamon Press, Ltd., London.

LEON D. ROSDOL, *Primary Examiner.*

CARL D. QUARFORTH, REUBEN EPSTEIN, *Examiners.*

A. G. BOWEN, *Assistant Examiner.*